United States Patent
Reiners et al.

(10) Patent No.: US 9,639,958 B2
(45) Date of Patent: May 2, 2017

(54) SYNTHETIC COLORIZATION OF REAL-TIME IMMERSIVE ENVIRONMENTS

(71) Applicant: Caterpillar Inc., Peoria, IL (US)

(72) Inventors: Eric Alan Reiners, Washington, IL (US); Paul Edmund Rybski, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 6 days.

(21) Appl. No.: 14/662,762

(22) Filed: Mar. 19, 2015

(65) Prior Publication Data
US 2016/0275696 A1 Sep. 22, 2016

(51) Int. Cl.
*G06T 7/40* (2006.01)
*G06T 11/00* (2006.01)

(52) U.S. Cl.
CPC ............ *G06T 7/408* (2013.01); *G06T 11/001* (2013.01)

(58) Field of Classification Search
CPC ....... G06T 1/0014; G06T 17/05; G01S 17/88; G01S 17/89
See application file for complete search history.

(56) References Cited

U.S. PATENT DOCUMENTS

| | | | |
|---|---|---|---|
| 4,970,666 A | 11/1990 | Welsh et al. | |
| 5,103,306 A | 4/1992 | Weiman et al. | |
| 6,731,798 B1 | 5/2004 | Stearns | |
| 8,725,273 B2 | 5/2014 | Lenser et al. | |
| 2014/0214187 A1 | 7/2014 | Redenbo et al. | |
| 2014/0368807 A1* | 12/2014 | Rogan ................... | G01S 17/50 356/28 |

* cited by examiner

*Primary Examiner* — Antonio A Caschera
(74) *Attorney, Agent, or Firm* — Miller, Matthias & Hull

(57) ABSTRACT

A system related to synthetic colorization of real-time immersive environments is disclosed. The system discloses converting real-time camera data on-board a machine into signatures which describe the real-time camera data. The signatures are based on image properties, such as color, intensity, and illumination. The signatures, which require much less bandwidth than the real-time camera data to transmit, are transmitted to a remote operator station. The remote operator station utilizes the signatures to synthetically color and texture the environment surrounding the machine to provide an immersive environment to a user at the remote operator station.

18 Claims, 9 Drawing Sheets

SYNTHETIC COLORIZATION OF REAL-TIME IMMERSIVE ENVIRONMENTS

TECHNICAL FIELD

This patent disclosure relates generally to a system for colorizing an immersive environment and, more particularly, to a system for converting real-time camera data into synthetic color and texture signatures, which require less bandwidth for transmission compared to the real-time camera data.

BACKGROUND

At construction sites, there may be one or more machines operating in either an autonomous mode, a manual mode, or a semi-autonomous mode. If the machine is operating in a manual mode, a human controller may be located either in the cab of the machine or at a remote location. Each remote human controller may control multiple machines, for example, five machines. Each of the machines may have a number of sensors mounted to it. The sensors may record the environment surrounding the machine. This sensor data may then be transmitted from the machine to the remote human controller so that the remote human controller may see what she would see if she were actually in the cab of the machine.

U.S. Pat. No. 6,731,798 ("the '798 patent"), entitled "Method for Converting Digital Image Pixel Values Including Remote Services Provided Over a Network," purports to address the problem of converting digital image pixel values. The '798 patent describes a method for converting pixel values from a first range to a second range in the field of medical diagnostic systems and transmitting an image from a first location to a remote location. The design of the '798 patent, however, does not overcome or address restrictions, such as bandwidth of the communication channel or signal lag at remote locations. Accordingly, there is a need for an improved system for efficiently transmitting image data while retaining situational awareness.

SUMMARY

In one aspect, this disclosure describes a system for synthetically coloring and texturing an image, the system comprising a plurality of sensors located at a first location configured to gather data about an area surrounding the plurality of sensors; a first computer processor located at the first location configured to generate at least one signature based on the information gathered by the plurality of sensors and to transmit the at least one signature to a second location; and a second computer processor located at the second location configured to receive the at least one signature and to generate a synthetic environment based on the at least one signature.

In another aspect, this disclosure describes a method for synthetically coloring and texturing an image, the method comprising gathering data about an environment of a first location using a plurality of sensors at the first location; generating at least one signature based on the data gathered by the plurality of sensors at the first location; transmitting the at least one signature to a second location; receiving the at least one signature at the second location; and generating a synthetically colored and textured environment at the second location based on the at least one signature.

In yet another aspect, this disclosure describes a system for synthetically coloring and texturing an image, the system comprising a plurality of sensors configured to gather data about an environment surrounding the plurality of sensors; and a computer processor configured to generate at least one signature based on the data gathered by the plurality of sensors and to generate a synthetic environment based on the at least one signature.

DETAILED DESCRIPTION

Figure 1:
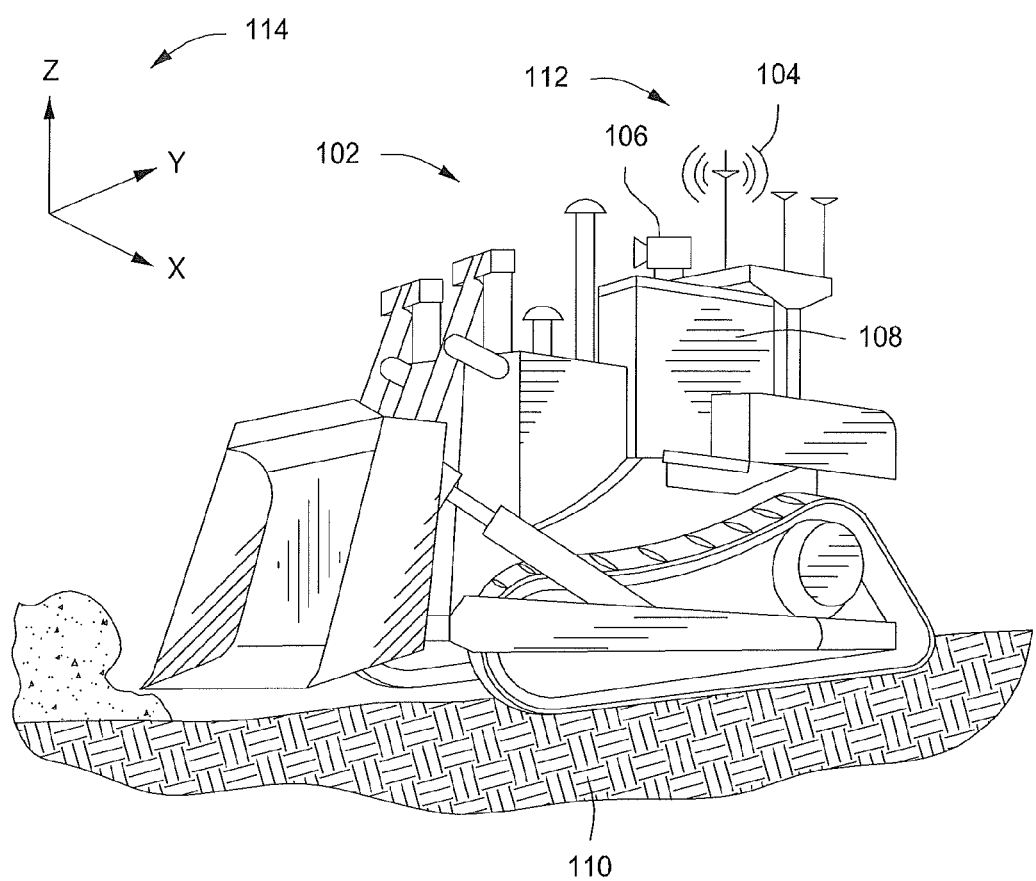
FIG. 1 is a perspective view of a machine, according to an aspect of this disclosure.

Now referring to the drawings, wherein like reference numbers refer to like elements, there is illustrated in FIG. 1 a perspective view of a machine 102, according to an aspect of this disclosure. The machine 102 is powered by an internal combustion engine adapted to burn a fuel to release the chemical energy therein and convert the chemical energy to mechanical power. The machine can be an "over-the-road" vehicle such as a truck used in transportation or may be any other type of machine that performs some type of operation associated with an industry such as mining, construction, farming, transportation, or any other industry known in the art. For example, the machine may be an off-highway truck, a locomotive, a marine vehicle or machine, an earth-moving machine, such as a wheel loader, an excavator, a dump truck, a backhoe, a motor grader, a material handler, a dozer, or the like. The term "machine" can also refer to stationary equipment like a generator that is driven by an internal combustion engine to generate electricity. The specific machine illustrated in FIG. 1 is a bulldozer.

Further, the machine 102 may be operable in either a manual mode, an autonomous mode, or a semi-autonomous mode. In the manual mode, the machine 102 may be controlled by a vehicle operator sitting within the cab 108 of the machine 102 or the machine 102 may be controlled by a controller located remotely from the machine 102 at a remote operator station 204 (see FIG. 2). In the autonomous mode, the machine 102 may be controlled without input from a vehicle operator.

The machine 102 may include a plurality of sensors 112 mounted thereon. One or more of the sensors may be environment sensors 104, such as a Light Detection and Ranging (LIDAR) sensor, Radio Detection and Ranging (RADAR), stereo vision, or other similar sensors known in the art. Another mounted sensor may be one or more video sensors 106, which may be a video camera, and which may be capable of recording video in color or grayscale. According to an aspect of this disclosure, the environment sensor 104 is a LIDAR sensor and the video sensor 106 is a video camera. However, it will be appreciated that other sensor configurations are contemplated to be within the scope of the disclosure.

Figure 2:
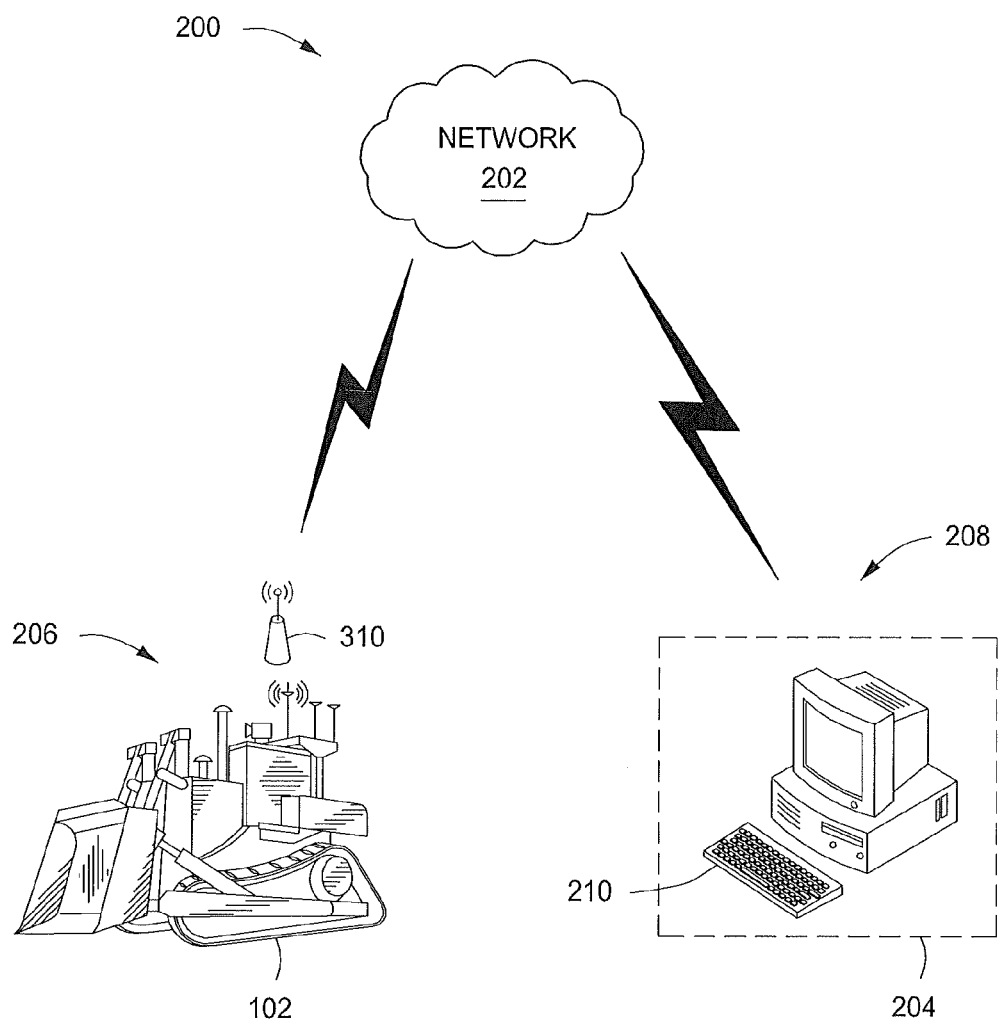
FIG. 2 is a schematic view of a machine system, according to an aspect of this disclosure.

FIG. 2 is a schematic view of a machine system, according to an aspect of this disclosure. FIG. 2 illustrates an overall schematic view of the machine system 200 including the machine 102, the communication network 202, and the remote operator station 204, according to one aspect of this disclosure. The data collected by the LIDAR sensor 104 and video camera 106 are collected at the location 206 of the machine 102. The collected LIDAR and video camera data may be wirelessly communicated to the remote operator station 204 at the remote location 208 via the communication network 202. The collected data may also be communicated to the remote operator station 204 using a wired communication medium.

The system 210 at the remote operator station 204 utilizes the collected LIDAR and camera data to generate a synthetically colored and textured environment. The synthetically colored and textured environment may then be displayed to a remote control operator located at the remote operator station 204. The remote control operator may then use the displayed synthetically colored and textured environment to remotely manually operate the machine 102.

Figure 3:
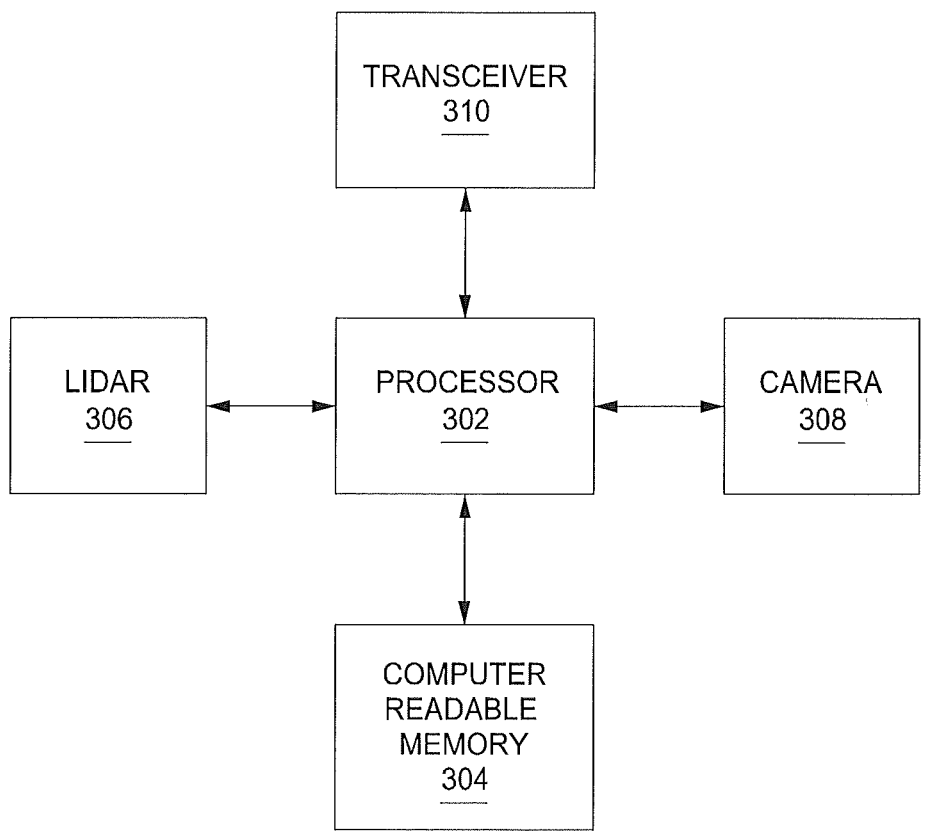
FIG. 3 is a block diagram of the components located on the machine, according to an aspect of this disclosure.

FIG. 3 is a block diagram of the components located on the machine, according to an aspect of this disclosure. The components located on the machine 102 may include a processor 302, a computer readable memory 304, one or more LIDAR sensors 306, one or more video cameras 308, and one or more transceivers 310. Broadly, the processor 302 receives as inputs raw data from the one or more LIDAR sensors 306 and one or more video cameras 308. The processor 302 executes instructions on the received raw LIDAR and camera data to carry out aspects of this disclosure. Once the instructions have been executed, the processor 302 transmits the processed data to the one or more transceivers 310 for transmission to the remote operator station 204. The processor 302 may also execute instructions to process any data received from the remote operator station 204 via the one or more transceivers 310. Such instructions may include, but are not limited to, instructions to control movement of the machine 102. The processor 302 utilizes the computer readable memory 304 as needed to execute the instructions according to an aspect of this disclosure. While this disclosure describes an aspect where one processor, one computer readable memory, and one transceiver are utilized, it will be appreciated that other configurations, such as a distributed network of processors, computer readable memories, and transceivers are contemplated to be within the scope of this disclosure.

More particularly, the one or more LIDAR sensors 306 execute operations to gather information about the environment surrounding the machine 102. The one or more LIDAR sensors 306 may irradiate a target with a laser and analyze the reflected light to measure the distance between the one or more LIDAR sensors 306 and the irradiated object. LIDAR sensors have been used in autonomous vehicles, surveying, geology, and soil science. LIDAR sensors are capable of detecting subtle topographic features, such as river terraces. The LIDAR sensors are also proven for resolving spatial derivatives of elevation and detecting elevation changes between repeat surveys. LIDAR sensors may be utilized to generate high resolution maps as well as digital terrain models and digital elevation models. Thus, although this disclosure is not limited to using LIDAR sensors, LIDAR sensors may be useful in the machine system 200.

According to one aspect of this disclosure, one or more LIDAR sensors 306 may be mounted on the machine 102. During operation of the LIDAR sensors 306, the LIDAR sensors 306 survey the terrain surrounding the machine 102. The one or more LIDAR sensors 306 may transmit the collected data to the processor 302. The processor 302 may generate a point cloud 404 (see FIG. 4) based on the data received from the one or more LIDAR sensors 306. A point cloud 404 is a set of data points in a coordinate system, such as the Cartesian coordinate system 114 (see FIG. 1) represented by X, Y, and Z coordinates. The environment generated by the point cloud 404 is discussed in more detail with respect to FIG. 4. As the machine 102 moves, the one or more LIDAR sensors 306 periodically collect more data about the terrain to generate a new point cloud 404. Thus, the point cloud 404 is updated in real-time as the machine 102 traverses the environment. While this disclosure describes an aspect where the X, Y, and Z coordinates represent spatial coordinates, it will be appreciated that one or more of the X, Y, and Z coordinates may represent other data, such as color and intensity. Further, it will be appreciated that coordinate systems other than Cartesian coordinate systems may be used, including, radial coordinates, spherical coordinates, or any other coordinate system known in the art.

According to one aspect of this disclosure, one or more video cameras 308 may be mounted on to the machine 102. The one or more video cameras 308 mounted on to the machine 102 may capture video data in grayscale, color, or any other suitable scheme. Additionally, the one or more video cameras 308 may be either analog or digital cameras. If the one or more video cameras 308 are digital, then the one or more video cameras 308 may capture video data in various resolutions, such as 720p, 1080p, 4k, or any other suitable resolution. The one or more video cameras 308 may also capture data at various frame rates, such as 60 Hz, 120 Hz, 240 Hz, or any other suitable frame rate.

One or more video cameras 308 may be mounted on to the machine 102 to capture images of different areas of the environment surrounding the machine 102. During operation of the one or more video cameras 308, the one or more video cameras 308 may begin recording data about the environment surrounding the machine 102. The captured data is related to, for example, color, brightness, shades, color tones, color intensities, hue, and saturation level. Data about other characteristics of the environment may be captured as well. If analog video cameras are used, then the one or more video cameras 308 may produce continuous-tone images. In this scenario, the continuous-tone image may be digitized using conventional methods. The quality of the resulting digital image is known as the image resolution. Images with greater resolutions have a greater capability of reproducing fine details from the original continuous-tone image.

A related concept is spatial resolution, which is the number of pixels used in constructing a digital image. As the number of pixels used in digitizing an image increases, the spatial resolution of the image increases as well. The greater the number of pixels used in an image, the more the digitized image will retain the characteristics of the original, analog image. Thus, when digitizing an image captured by the one or more video cameras 308, a minimum image resolution may be chosen to ensure that sufficient details in the environment surrounding the machine 102 are clear. However, as the minimum image resolution increases, the amount of data needed to encode the image increases as well. Thus, when transmitting the images from the machine 102 to the remote operator station 204, greater bandwidth is needed for greater resolution images. However, there may often be bandwidth limitations which prevent transmitting images with sufficient resolution from the machine 102 to the remote operator station 204. As described herein, a system and a method to transmit images with sufficient resolution in bandwidth-limited environments is disclosed.

The processor 302 receives as an input the image data captured by the one or more video cameras 308 and outputs to the one or more transceivers 310 a signature. The image data captured by the one or more video cameras 308 represents an overall image of the overall environment. The processor 302 may process sub-images, which are a portion of the overall image. The signature describes the data captured by the one or more video cameras 308. The signature may describe a sub-image rather than the overall image. However, in one aspect of this disclosure, the signature may describe the overall image as well. Thus, since a description of the data, and not the data itself, is transmitted from the machine 102 to the remote operator station 204, less bandwidth is required. The baseline data that may be used to generate the signature is, for example, an image, which may be based on a variably sized window. The size of the variably sized window may depend on multiple factors, including the shape of the three-dimensional (3D) ground as sensed by the one or more LIDAR sensors 306. The processor 302 may use principles of spatial frequency to illustrate how complex the texture of the environment is. In other words, the processor 302 may determine if the image contains many little details, making the texture rough, or fewer, larger details, making the image smoother. Additionally, the processor 302 may use gradient and spacing information from the one or more LIDAR sensors 306 to help determine the number of pixels in each variably sized image. Using at least some of this information, the processor 302 may generate the signature describing the image captured by the one or more video cameras 308.

The processor 302 may output this signature to the one or more transceivers 310, which may transmit the signature to the remote operator station 204 according to standard communication protocols. The processor 302 may generate more than one signature for each variably sized window. Examples of signatures the processor 302 may generate may be based on, for example, color, intensity, or illumination. Depending on the application, other image characteristics may also be used to generate signatures to be transmitted to the remote operator station 204.

Figure 4:
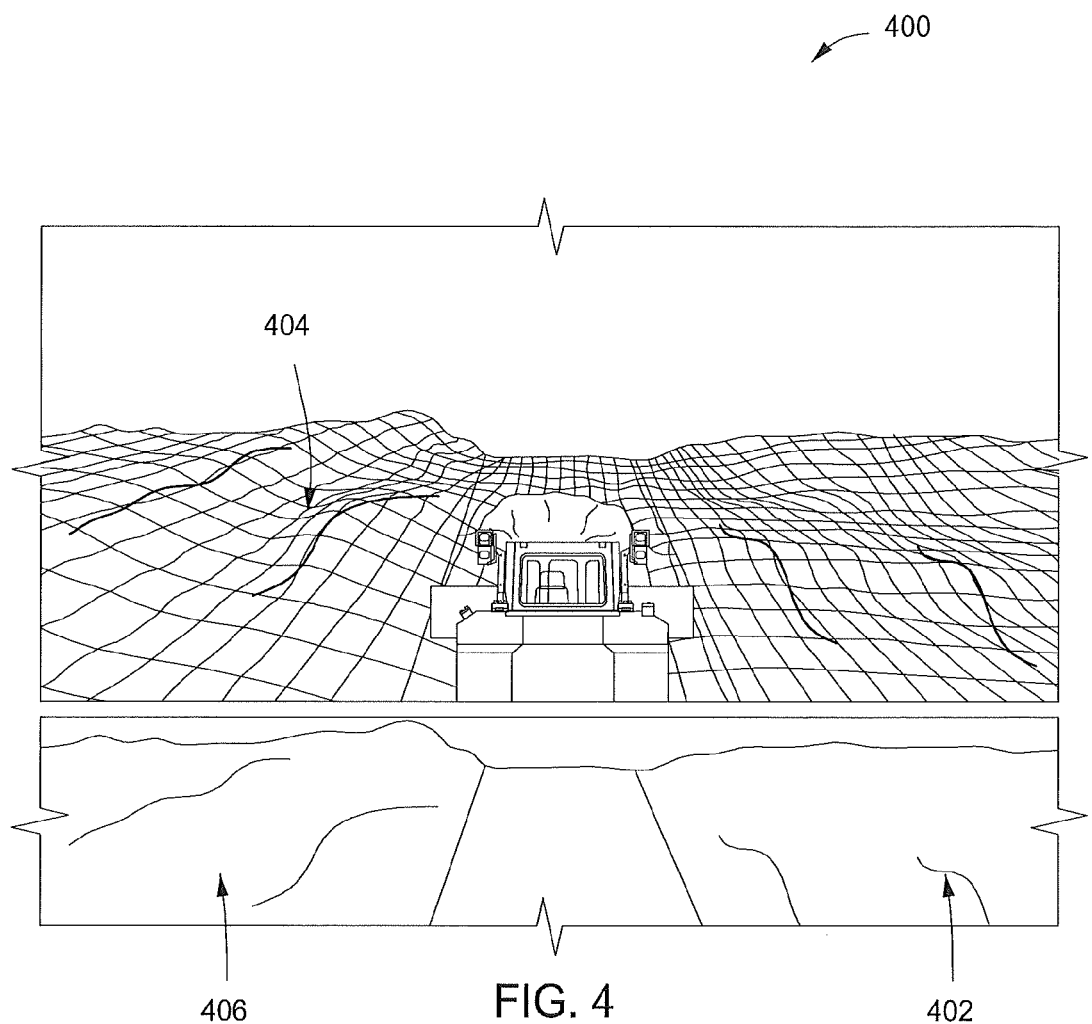
FIG. 4 is a composite view of a machine environment, according to one aspect of this disclosure.

FIG. 4 is a composite view of a machine environment 400, according to one aspect of this disclosure. FIG. 4 illustrates a camera image of the environment 402 and a camera image of the ground 406 surrounding the machine 102. The point cloud 404 may be a grid-like representation of the camera image of the ground 406 surrounding the machine 102. The point cloud 404 captures surface details, such as changes in elevation and roughness in the environment 110. While the point cloud 404 may display fine details of environment changes, it does not generate any situational awareness information, such as color or illumination, of the camera image of the environment 402 or the camera image of the ground 406. Therefore, the point cloud 404, by itself, does not provide sufficient details about the environment 110 surrounding the machine 102 to the operator located at the remote operator station 204 to successfully operate the machine 102 remotely. However, when situational awareness information is excluded from the point cloud 404, transmitting the point cloud 404 from the machine 102 to the remote operator station 204 may be feasible in a bandwidth-constrained environment.

Figure 5A:
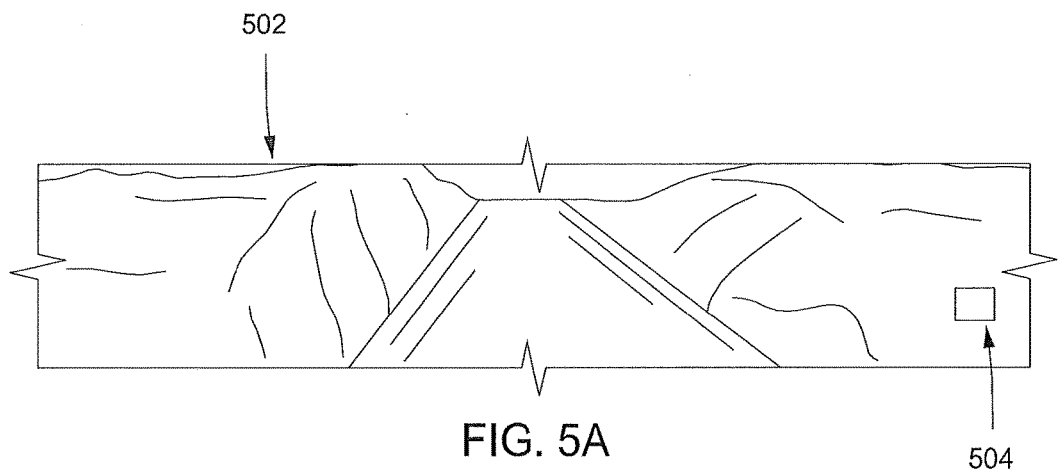
FIGS. 5A and 5B show a digital image and its composite red-green-blue (RGB) histogram, respectively, according to an aspect of this disclosure.
Figure 5B:
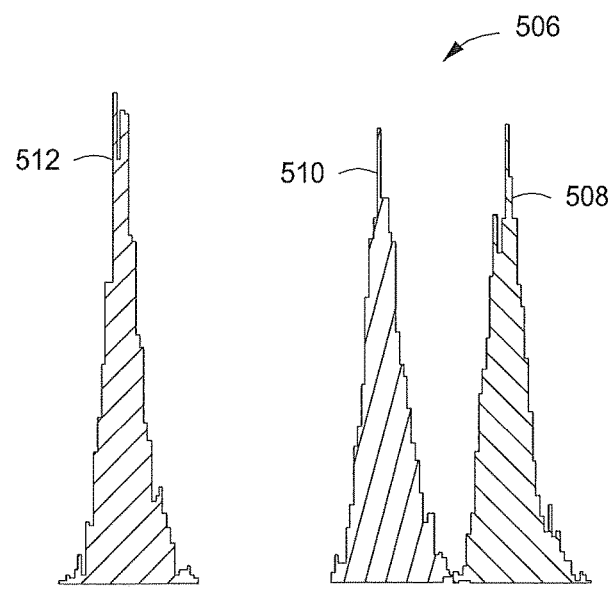

FIGS. 5A and 5B show a digital image 502 and the composite red-green-blue (RGB) histogram 506 for sub-image 504, respectively, according to an aspect of this disclosure. While the operation of this system will be described in relation to a composite RGB histogram 506, other types of histograms, such as hue-saturation-lightness (HSL) and hue-saturation-value (HSV) histograms may also be utilized.

A color histogram is a graphical representation of the distribution and frequency of colors in an image. For example, in an RGB histogram, the different colors in an image are derived from varying combinations of the red, green, and blue color channels. Thus, in an RGB histogram, each pixel of a digital image is assigned three values, one value for each of the color channels. In FIG. 5, there is shown a digital image 502, a sub-image 504, and a composite RGB histogram 506 showing the red 508, green 510, and blue 512 color channels representing the colors of the sub-image 504. Using the red 508, green 510, and blue 512 color channels, the processor 302 may generate a color signature for each of the red 508, green 510, and blue 512 color channels. Alternatively, the processor 302 may generate a color signature for the composite RGB histogram 506. Each of the generated color signatures describes the data in their respective red 508, green 510, and blue 512 color channels.

Histograms representing other image properties may be used as well. For example, the system may use one histogram for intensity and another histogram for illumination. The processor 302 may generate a signature for each of these other histograms as well.

These generated signatures may be transmitted from the processor 302 to the one or more transceivers 310. The one or more transceivers 310 may then transmit the signatures to the remote operator station 204 via the communication network 202.

Figure 6:
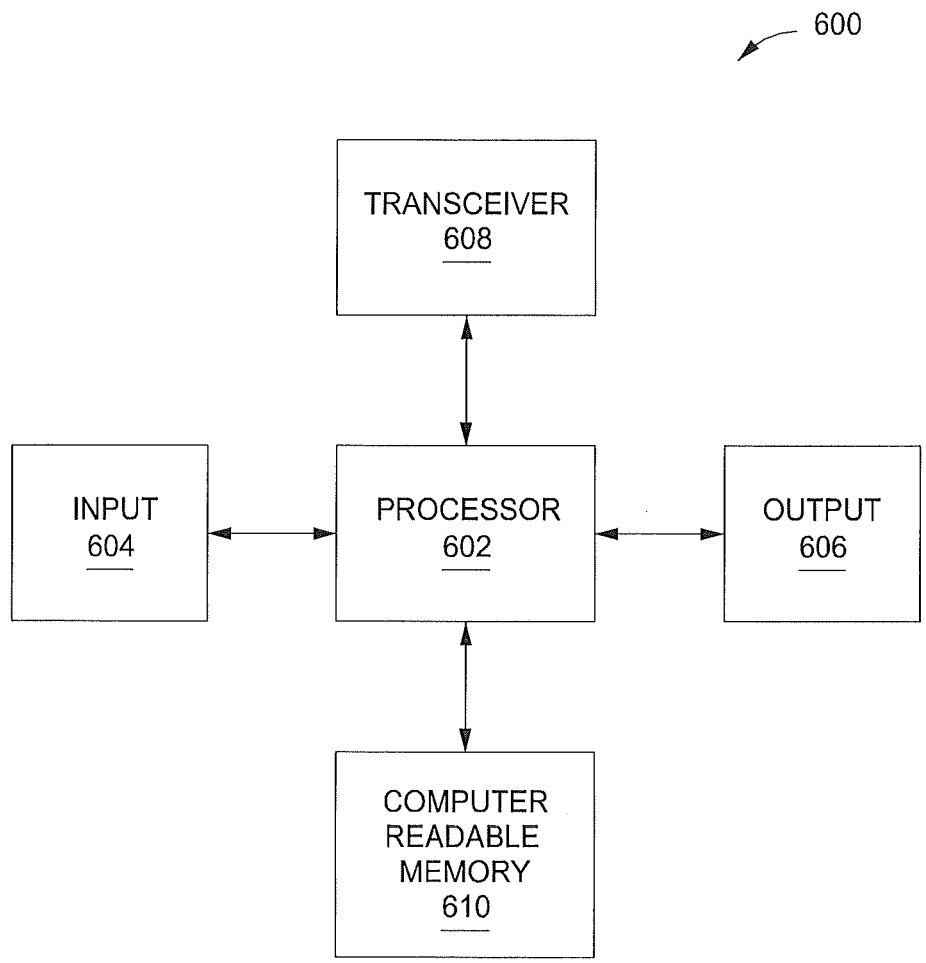
FIG. 6 is a block diagram of components located at the remote operator station, according to an aspect of this disclosure.

FIG. 6 is a block diagram of components located at the remote operator station 204, according to an aspect of this disclosure. The computing system 600 located at the remote operator station 204 comprises a processor 602, an input 604, an output 606, one or more transceivers 608, and a computer readable memory 610. One or more transceivers 608 receive data from the machine 102 via the communication network 202. Such data may include the point cloud 404 generated from the LIDAR data and the signatures generated by the processor 302 located on board the machine 102. The processor 602 receives as inputs the point cloud 404 data and the signatures from the one or more transceivers 608 and executes instructions to carry out a system according to one aspect of this disclosure.

The processor 602 executes instructions to correlate the signatures, which describe the image data captured by the one or more video cameras 308 mounted on the machine 102. The processor 602 may utilize each of the signatures received for a given sub-image or image window as an index. The processor 602 may use none, one, some, or all of the signatures received as indices for selecting a synthetic color and texture from a synthetic palette. The synthetic palette may contain a plurality of synthetic colors and textures. The synthetic palette may be stored on the computer readable memory 610 as any type of suitable data structure. The processor 602 uses the indices to select a synthetic color and texture which most closely represents the image described by the signatures, which should closely approximate the image data captured by the one or more video cameras 308. In one aspect of this disclosure, once the processor 602 has selected a synthetic color and texture, the processor 602 may correlate the synthetic color and texture to a specific location in the LIDAR-generated point cloud 404. The processor 602 may then apply the selected synthetic color and texture to the specific location in the point cloud 404. The processor 602 may then output the combined point cloud 404 data and synthetic color and texture data to the output 606, which may comprise a display. The user at the remote operator station 204 may, for example, use the displayed information to remotely control via the input 604 the machine 102.

In another aspect of this disclosure, the computing system 600 may improve the consistency of the overall synthetically colored and textured image. A smoother transition from one sub-image to an adjacent sub-image provides a more realistic and more accurate representation of the environment surrounding the machine 102. One manner in which the computing system 600 may achieve a more consistent synthetically colored and textured overall image is to compare a given sub-image with its adjacent sub-images. For example, the computing system 600 may use an iterative algorithm for each of the sub-images to achieve a more consistent output. Other algorithms other than an iterative algorithm may be used as well.

The computing system 600 may modify one or more characteristics of the sub-image being compared to more closely match one or more characteristics of the adjacent sub-image. An entire sub-image may be compared with another entire sub-image; however, it is not necessary. To reduce computational complexity, the computing system 600 may compare characteristics of edges of a sub-image with characteristics of edges of an adjacent sub-image. When the computing system 600 compares characteristics of edges, the computing system 600 may modify the one or more characteristics at the edges of the sub-image rather than the characteristics of the entire sub-image.

In yet another aspect of this disclosure, the computing system 600 may improve the contrast within a synthetically colored and textured overall image. For example, a resulting synthetically colored and textured overall image may not clearly distinguish various features clearly enough. One manner in which the computing system 600 may produce an overall image with greater contrast is to analyze a sub-image and determine the amount of contrast presently in the sub-image. Once the amount of contrast has been determined, the processor 602 may increase or decrease the contrast based on input received from the input 604. This input may come from a user at the remote operator station 204 or it may be the result of pre-defined minimum or maximum contrast values. When adjusting contrast, the processor 602 may or may not compare the contrast of a given sub-image with the contrast of adjacent sub-images.

In another aspect of this disclosure, the computing system 600 may implement a method to more efficiently synthetically colorize and texturize the overall image. In one aspect of the computing system 600, the processor 602 may synthetically colorize and texturize the overall image by colorizing and texturizing one sub-image at a time. However, this method may be time consuming and computationally intensive. Thus, an alternative method to synthetically colorize and texturize the overall image is to colorize and texturize groups of sub-images which have the same synthetic color and texture. As an example, the overall image may be composed of 100 smaller sub-images. Fifteen of those sub-images, for example, may have the same synthetic color and texture. Thus, to increase computational efficiency, the processor 602 may implement a function to colorize and texturize those fifteen sub-images at once.

In another aspect of this disclosure, the computing system 600 may improve illumination of the resulting overall image. One method to achieve better illumination may be to take into account various environmental and seasonal factors, such as the season, the day of the year, the year, the time of the day, and a compass. Factors such as these may be used by the processor 602 to adjust the illumination information provided by the image signatures sent from the machine 102. Alternatively, factors such as these may be used to establish a baseline, macro level view of the work site the machine 102 is operating in general. Alternatively, or in addition, inputs such as these may provide deviations from the actual illumination of the work site.

In another aspect of this disclosure, the computing system 600 may learn information about the environment surrounding the machine 102. For example, the computing system 600 may learn average color parameters for a given work site using signatures collected over a time period. Thus, once the computing system 600 learns the average color parameters, the system may establish a baseline synthetic color and texture palette for the work site's images. One benefit of the computing system 600 learning about the work site, such as the work site's color and texture parameters, may be faster colorization or reduced data transmission. For example, if the computing system 600 has already correctly synthetically colorized and texturized a sub-image as a result of learning the average color and texture parameters, the computing system 600 may no longer need to synthetically colorize and texture the sub-image using the signatures. Thus, the computing system 600 would be able to synthetically colorize and texturize the overall image faster. Additionally, if the computing system 600 has learned the work site's environment sufficiently well, the processor 302 located on the machine 102 may not need to send as many signatures. Thus, such machine learning may result in needing less bandwidth as well.

In another aspect of this disclosure, the computing system 600 may manipulate the synthetically colored and textured environment. For example, certain features of a work site, such as a slope of the ground, may be useful to the operator. In one aspect, the computing system 600 may manipulate the synthetically colored and textured environment by, for example, highlighting areas of the ground that, for example, exceeds a gradient. The computing system 600 may manipulate the synthetically colored and textured environment based on pre-defined conditions, which may be stored in the computer readable memory 610. Alternatively, the computing system 600 may manipulate the synthetically colored and textured environment in response to inputs from an operator defining which elements, or groups of elements, should be highlighted. The computing system 600 may manipulate the synthetically colored and textured environment in ways other than highlighting that make certain features of the synthetically colored and textured environment distinct from other features in the synthetically colored and textured environment. Moreover, if, for example, the ambient light at the machine location 206 is dim or dark, the computing system 600 may manipulate the synthetically colored and textured environment to make the synthetically colored and textured environment brighter. Thus, an operator of the machine 102, whether within the cab 108 or located at the remote operator station 204, may operate the machine 102 even when it is dim or dark at the machine location 206 using the brightened synthetically colored and textured environment.

Figure 7:
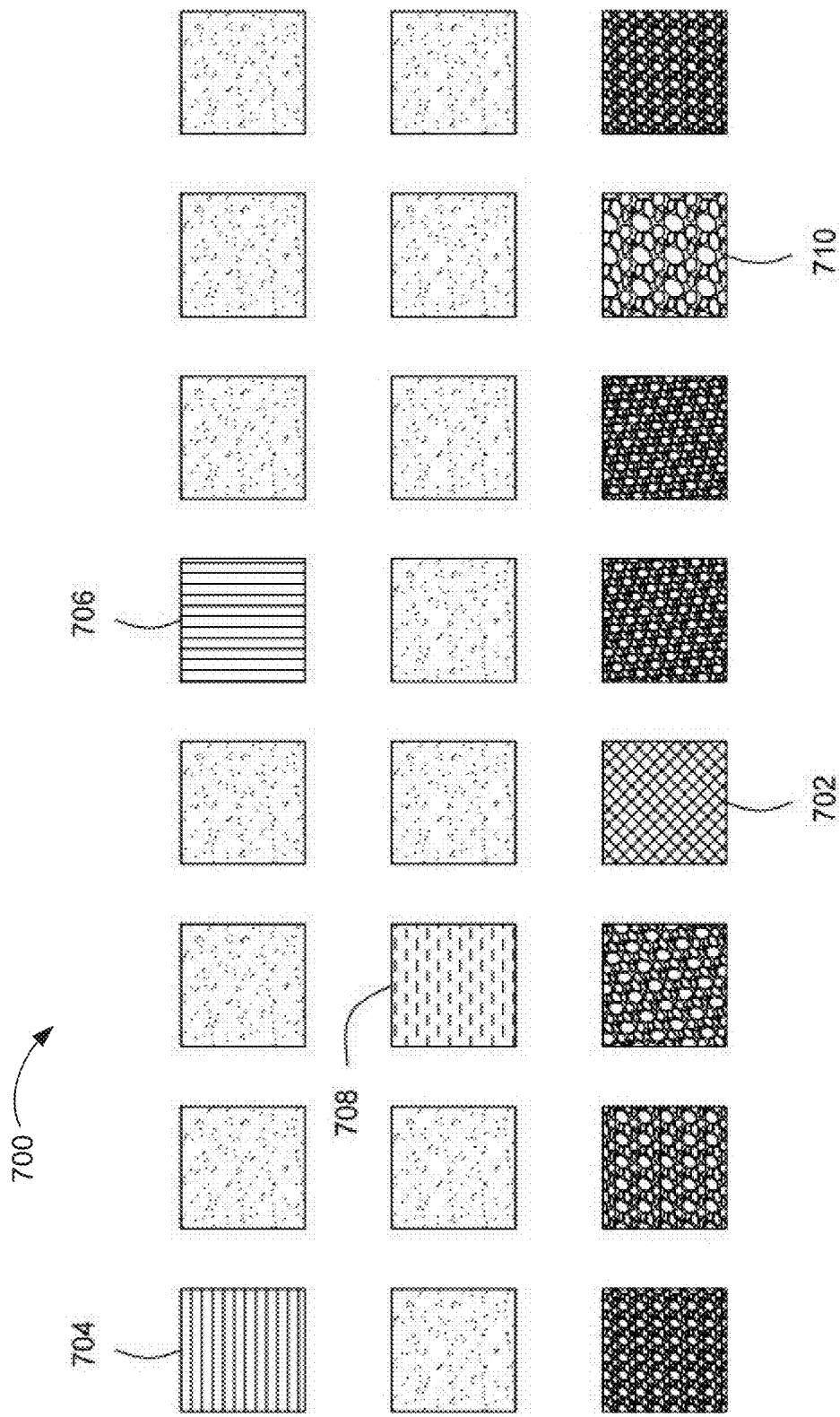
FIG. 7 is a synthetic color and texture palette, according to an aspect of this disclosure.

FIG. 7 is a synthetic color and texture palette 700, according to an aspect of this disclosure. Illustrated is a palette comprising a plurality of synthetic color and texture combinations. Such a synthetic color and texture palette 700 may be stored, for example, on the computer readable memory 610 located at the remote operator station 204. The synthetic coloring in FIG. 7 ranges from a light green 702 to a dark green 704. Additionally, the color may not be uniform throughout a given synthetic color and texture combination. For example, Surface 706 shows a mostly synthetic green surface mixed with synthetic brown. Additionally, FIG. 7 shows a variety of synthetic textures. For example, Surface 708 shows a predominantly uniform surface, as indicated by the smoothness. Surface 710, on the other hand, shows a rougher terrain than shown in Surface 708.

Figure 8:
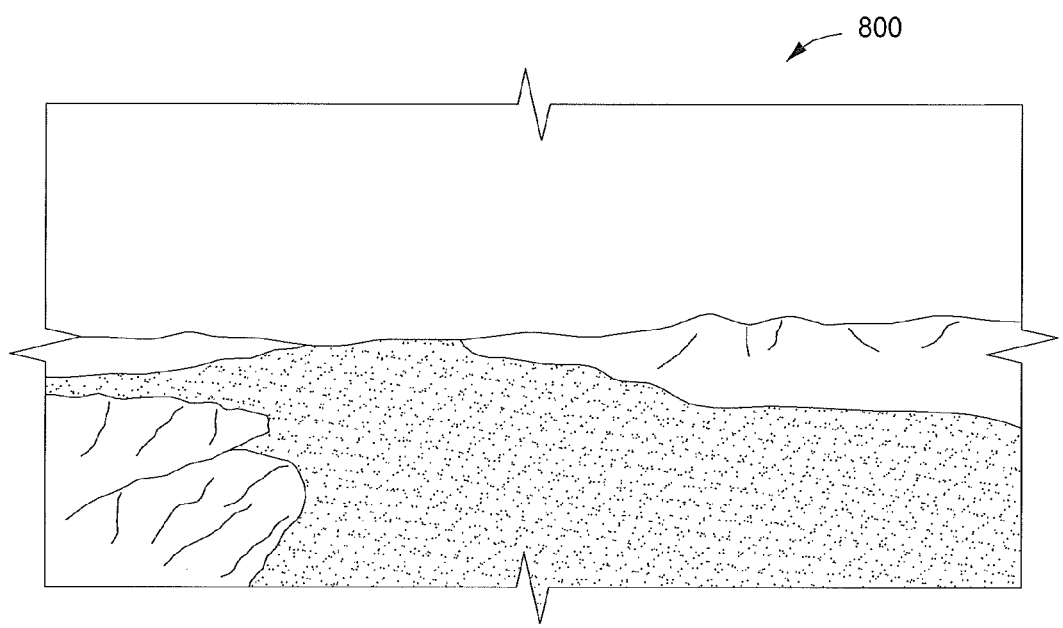
FIG. 8 is a composite image of the sensor-generated terrain map and the synthetic colorization of the image captured by the cameras located on the machine, according to an aspect of this disclosure.

FIG. 8 is a composite image of the sensor-generated terrain map and the synthetic colorization of the image captured 800 by the cameras located on the machine, according to an aspect of this disclosure.

INDUSTRIAL APPLICABILITY

This disclosure is applicable to a system for colorizing an immersive environment and, more particularly, to a system for converting real-time camera data into synthetic color and texture signatures, which requires less bandwidth for transmission when compared to real-time camera data.

A plurality of sensors 112 on the machine 102 may be necessary to capture sufficient data about the surrounding environment 110 to provide the remote human controller located at the remote operator station 204 an immersive environment. Sensor data may be transmitted from the machine 102 to the remote human controller in one of two ways. The first way sends the sensor data, unaltered, to the remote human controller. This approach, however, may require a relatively high-bandwidth communication channel between the machine 102 and the remote human controller. To send the sensor data from multiple sensors on the machine 102 would require a significant amount of bandwidth, which may not always be feasible. This challenge is exacerbated if there are multiple sensors mounted on multiple machines transmitting sensor data from a given work site to a remote control station. The second option attempts to overcome the bandwidth problem by transmitting a limited version of the sensor data, such as in grayscale rather than in color. Grayscale transmission requires less bandwidth than color transmission. However, this approach does not provide as much situational awareness because it is lacking, for example, color and texture information. However, these configurations may pose challenges for transmitting the sensor data efficiently from the machine 102 to the remote human controller.

Figure 9:
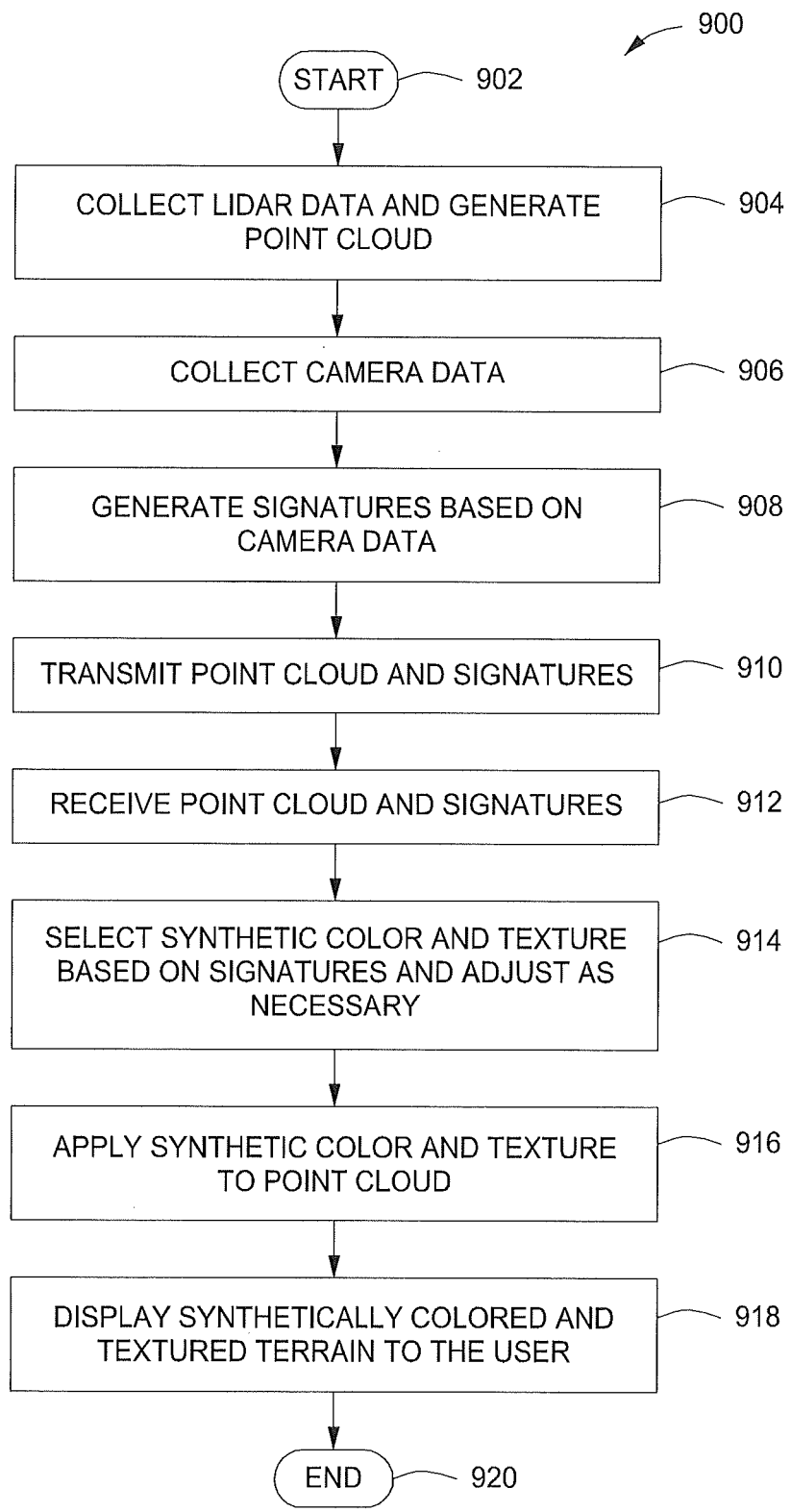
FIG. 9 is a flowchart illustrating the steps to carry out one aspect of this disclosure.

FIG. 9 is a flowchart illustrating the steps to carry out one aspect of this disclosure. A method 900 according to one aspect of this disclosure begins at 902 and proceeds to 904.

At 904, the one or more LIDAR sensors 306 located on the machine 102 are activated. Once the one or more LIDAR sensors 306 are activated, they begin to sense the environment surrounding the machine 102. After the one or more LIDAR sensors 306 have sensed the surrounding environment, or simultaneously, a processor located on the machine 102 may generate a point cloud 404 representing a visual colorless and textureless depiction of the surrounding environment, as depicted in FIG. 4. After completing 904, the method proceeds to 906.

At 906, the one or more video cameras 308 mounted on to the machine 102 are initialized and begin capturing data about the environment surrounding the machine 102. 904 and 906 may be performed sequentially or simultaneously. Also, if the steps are performed sequentially, 906 may occur before 904. After completing 906, the method proceeds to 908.

At 908, the processor 302 on board the machine 102 may compute one or more signatures based on the video camera data gathered in 906. The processor 302 may decompose the overall image into smaller, variably sized sub-images. The size of the sub-images may depend on the complexity of the environment as determined by, for example, the point cloud 404 generated from the LIDAR data. Once a sub-image has been defined, the processor 302 may generate one or more signatures describing the sub-image. For example, the processor 302 may generate one signature describing the color of the sub-image, another signature describing the color intensity of the sub-image, and a third signature describing the illumination of the sub-image. After completing 908, the method proceeds to 910.

At 910, the machine 102 transmits the point cloud 404 and the signatures from the machine 102 to the remote operator station 204. Since the signatures, which describe the image data captured by the one or more video cameras 308, are transmitted, less bandwidth is required than would be necessary if the image data captured by the one or more video cameras 308 were transmitted. The data may be transmitted from the machine 102 to the remote operator station 204 using wired, wireless, or a combination of wired and wireless communication media and according to known data transmission protocols. After completing 910, the method proceeds to 912.

At 912, the computing system 600 located at the remote operator station 204 receives the point cloud 404 and signatures transmitted from the machine 102. After completing 912, the method proceeds to 914.

At 914, the computing system 600 located at the remote operator station 204 executes instructions to select a synthetic color and texture based on the signatures, as explained hereinabove with reference to FIG. 6. Additionally, as also described in relation to FIG. 6, the processor 602 may tune the selected synthetic color and texture to provide a more realistic environment or to satisfy the user's requests. After completing 914, the method proceeds to 916.

At 916, the computing system 600 applies the selected synthetic color and texture to the correlated area of the point cloud 404. The computing system 600 performs this step for each sub-image of the overall image until the overall image has been fully synthetically colored and textured. After completing 916, the method proceeds to 918.

At 918, the computing system 600 displays the synthetically colored and textured image to the user. The user may be located at the remote operator station 204. Alternatively, the user may be located within the cab 108 of the machine 102. After completing 918, the method proceeds to 920 and ends.

For the purposes of this disclosure a computer readable medium stores computer data, which data can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

The present disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), Code-Division Multiple Access (CDMA), Wideband Code-Division Multiple Access (W-CDMA), Wireless Fidelity (Wi-Fi), Bluetooth, and/or the like, and/or a combination of two or more thereof.

In an embodiment, the present disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system, or the like.

Further in accordance with various aspects of the present disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A system for synthetically coloring and texturing an image, the system comprising:
   a plurality of sensors located at a first location configured to gather data about an environment surrounding the plurality of sensors;
   a first computer processor located at the first location configured to generate at least one signature, the at least one signature being a description of the data gathered by the plurality of sensors, and to transmit the at least one signature to a second location;
   a second computer processor located at the second location configured to:
      receive the at least one signature and to generate a synthetic environment based on the at least one signature,
      compare a sub-image with adjacent sub-images in an overall image using an iterative algorithm, and
      modify one or more characteristics of the sub-image to more closely match one or more image characteristics of the adjacent sub-images.

2. The system of claim 1, wherein:
   one sensor of the plurality of sensors located at the first location is a Light Detection and Ranging (LIDAR) sensor; and
   the first computer processor is further configured to generate a point cloud based on data gathered by the LIDAR sensor and to transmit the point cloud from the first location to the second location.

3. The system of claim 2, wherein the second computer processor is further configured to correlate the synthetic environment to a specific location in the point cloud.

4. The system of claim 1, wherein the at least one signature is generated based on at least one of a color, an intensity, and an illumination.

5. The system of claim 1, wherein the second computer processor is further configured to use the at least one signature as an index to select a synthetic color and texture from a plurality of synthetic colors and textures.

6. The system of claim 1, wherein the first computer processor is further configured to generate a variably sized window, the size of the variably sized window is based on a shape of a three-dimensional (3D) ground surface as sensed by one sensor of the plurality of sensors.

7. The system of claim 6, wherein the at least one signature is based on the variably sized window.

8. The system of claim 1, wherein the second computer processor is further configured to manipulate the synthetic environment to highlight features of the area surrounding the plurality of sensors of the first location.

9. The system of claim 1, wherein the second computer processor collects signatures over a time period to generate baseline synthetic color and texture parameters of the first location.

10. A method for synthetically coloring and texturing an image, the method comprising:
gathering data about an environment of a first location using a plurality of sensors at the first location;
generating at least one signature, the at least one signature being a description of the data gathered by the plurality of sensors, at the first location, using a first computer processor located at the first location;
transmitting the at least one signature to a second location, using the first computer processor;
receiving the at least one signature at the second location, by a second computer processor located at the second location;
generating a synthetic environment at the second location based on the at least one signature, using the second computer processor;
comparing a sub-image with adjacent sub-images in an overall image using an iterative algorithm executed by the second computer processor; and
modifying one or more characteristics of the sub-image to more closely match one or more image characteristics of the adjacent sub-images, using the second computer processor.

11. The method of claim 10, further comprising:
generating a point cloud based on data gathered by a Light Detection and Ranging (LIDAR) sensor; and
transmitting the point cloud from the first location to the second location, using the first computer processor.

12. The method of claim 11, wherein the generating the synthetic environment at the second location further comprises correlating the synthetic environment to a specific location in the point cloud.

13. The method of claim 10, wherein the generating the synthetically colored and textured environment at the second location further comprises:
using the at least one signature as an index to select a synthetic color and texture from a plurality of synthetic colors and textures by the second computer processor.

14. The method of claim 10, further comprising:
generating a variably sized window, wherein a size of the variably sized window is based on a shape of a three-dimensional (3D) ground surface as sensed by one sensor of the plurality of sensors, using the first computer processor.

15. The method of claim 14, wherein the at least one signature is based on the variably sized window.

16. The method of claim 10, further comprising:
manipulating the synthetically colored and textured environment to highlight features of the environment of the first location, using the second computer processor.

17. The method of claim 10, further comprising:
collecting signatures at the second location, by the second computer processor, over a time period to generate baseline synthetic color and texture parameters of the first location.

18. A system for synthetically coloring and texturing an image, the system comprising:
a plurality of sensors located at a first location configured to gather data about an environment surrounding the plurality of sensors;
a first computer processor located at the first location configured to:
generate at least one signature, the at least one signature being a description of the data gathered by the plurality of sensors,
transmit the at least one signature to a second location; and
generate a variably sized window, the size of the variably sized window is based on a shape of a three-dimensional (3D) ground surface as sensed by one sensor of the plurality of sensors; and
a second computer processor located at the second location configured to receive the at least one signature and to generate a synthetic environment based on the at least one signature.

* * * * *